3,787,357
SYNERGISTIC MERCAPTO ORGANOTIN STABILIZERS
Lawrence Robert Brecker, Brooklyn, N.Y., assignor to Argus Chemical Corporation, Brooklyn, N.Y.
No Drawing. Filed Sept. 7, 1972, Ser. No. 287,118
Int. Cl. C08f 45/62
U.S. Cl. 260—45.75 K          29 Claims

ABSTRACT OF THE DISCLOSURE

A synergistic stabilizer composition which is liquid at ambient temperature is provided for increasing resistance to early discoloration of polyvinyl chloride resins heated to 400° F. and for improving their processability comprising: (1) at least one monoalkyltin mercaptocarboxylic acid ester having tetravalent tin linked directly to carbon and to sulfur, (2) at least one dialkyltin compound, having tetravalent tin linked directly to carbon and to sulfur, for example, organotin sulfide, a mercaptocarboxylic acid ester or an ester sulfide, (3) barium carbonate and (4) an organic salt acting as a liquifier for the barium carbonate.

---

The ability to tolerate higher temperatures in compound and processing PVC is most desirable. This in turn is directly relate to the ability to prevent or at least minimize the thermal degradation that sets an upper limit to applicable processing temperatures. Here, stabilizers may a two-fold role. They exert a chemical effect, still insufficiently understood, that results in a much reduced degradation of the resin. In addition, stabilizers can profoundly affect the manner in which the resin composition fuses and flows in response to applied heat and pressure. Some stabilizers accelerate fusion while others delay fusion under comparable conditions. The rheological influence of stabilizers is quite unpredictable and is responsible for the differences sometimes seen between "static" oven heat stability tests and tests carried out under "dynamic" conditions, that is tests on a moving two roll mill, mixing machine, or extruder. The search for improved stabilizers, therefore, is a quest for materials that exhibit desirable characteristics in both static and dynamic tests.

This invention relates to stabilizer compositions for polyvinyl chloride (PVC) resins which stabilizer compositions are homogeneous liquids at ambient temperature and which comprise at least one monoorganotin mercaptocarboxylic acid ester, at least one dialkyltin compound, barium carbonate, and an organic salt acting as a liquifier for the carbonate, and which are characterized by visual homogeneity and the ability to evolve carbon dioxide gas when acidified with mineral acids, and to the PVC resin compositions containing these compounds, the PVC having, as a result of the synergistic action of these components, an improved resistance to development of discoloration during heating and particularly to early discoloration when heated, as well improved handling characteristics during processing. These desirable properties are afforded to a much higher degree when using such combinations of compounds than when using the compounds singularly, and are of particular value for PVC compositions intended to be processed or tested at a very high temperature, such as to 400° F. These very high temperatures are becoming increasingly important in processing rigid PVC by multiple screw extrusion and injection moldings and also in processing plastisols.

Among the organotin stabilizers, organotin mercaptocarboxylic acid esters are now recognized as being among the most effective stabilizers for inhibiting the degradation of polyvinyl chloride resins at the high temperatures, e.g. 350° F. to 375° F. to which they are subjected during working. Although these compounds have been successful in providing good stability for one hour or more at 350° F. to 375° F., many of these compounds impart or do not entirely prevent an early yellow discoloration to the resin, which is manifested before severe heat deterioration really sets in. This early discoloration has not been considered disadvantageous for many PVC uses where color is not an important factor, and the efforts of most workers in this field have been directed toward minimizing the onset of serious heat deterioration which sets in during long periods of heating, normally encountered in milling of PVC resins. When color of the PVC resin is an important factor because of discoloration and the accompanying haziness or cloudiness that may also appear, during processing at high temperatures it has not been possible in all cases to obtain a substantially clear and colorless PVC resin composition.

Although the organotin mercaptocarboxylic acid esters are very effective stabilizers for PVC, they are also among the most expensive. The inherent high cost of the tin metal is very much magnified by the complexity of the multi-step synthetic process by which the tin is converted to the desired thioorganotin stabilizer.

Only the aforementioned great stabilizing effectiveness of the organotin compound warrants the high cost of these compounds.

A very large number of stabilizers other than the organotin compounds are known. Many of them are cheaper than the organotins, but they are less effective. Stabilizers in commercial use are comprehensively listed for instance by H. A. Sarvetnick, "Polyvinyl Chloride" (Van Nostrand Reinhold Company, New York, 1969), pp. 98–104, who cites advantages and disadvantages of each class.

Liquid barium carbonate-barium alkyl phenate compositions have been used as barium components of barium-cadmium stabilizers, see Le Suer U.S. 3,194,823. Le Suer makes no suggestion that an organotin-sulfur compound might be combined with this barium-cadmium combination. This is readily understood because of the known objectionable interaction ("cross staining") between barium-cadmium and organotin mercaptide stabilizers (Sarvetnick, op. cit., p. 100).

Combinations of various types of additives with some organotin mercaptocarboxylic acid esters have been used to improve their heat stabilizing effectiveness in a synergistic manner. For example, U.S. Pat. 3,507,827 discloses combinations of diorganotin mercaptocarboxylic acid esters with alpha or beta mercapto acids with alpha or beta mercapto alcohols. U.S. 3,632,538 teaches the use of organotin sulfides in combination with organotin mercaptocarboxylic acid esters. In U.S. 3,627,716 stannous tin salts are disclosed as additives. U.S. 3,640,953 shows synergism between the complex of a diorganotin ester with an ester or plasticizer and an organotin mercaptocarboxylic acid ester. U.S. 2,789,963 issued Apr. 23, 1957 to A. C. Hecker, describes the combination of an organotin mercapto acid ester with the salt of a multivalent metal with a weak mono carboxylic acid, e.g. barium 2-ethylhexoate. However, the function of the salt is to prevent crystallization of the mercapto acid ester before compounded into PVC, i.e., it acts as a preservative and has no effect on early color and/or long term stability of the resins. A recent improvement over the stabilizing effectiveness of the organotin mercaptocarboxylic acid esters according to U.S. 3,565,930 are PVC resin stabilizer compositions having a relatively high concentration of tin, comprising an organotin α- or O-mercaptocarboxylic acid ester sulfide.

It has now been found that combinations of a mono-organotin carboxylic acid ester having tetravalent tin linked directly to carbon and to sulfur and a dialkyltin compound, such as an organotin sulfide, a mercaptocarboxylic acid ester or an ester sulfide and barium carbonate and at least one organic salt liquifying the carbonate have the property of increasing the resistance to discoloration of polyvinyl chloride resins particularly during the first ten minutes of heating to 400° F. to a much larger extent than afforded by the individual components used singularly. The compositions are homogeneous liquids at ambient temperature and can be readily measured and mixed into the resin, and are thus easy to formulate, market and use. To obtain the beneficial effects of the invention it is essential that the carbonate be in the liquid state.

In accordance with this invention there are provided stabilizer compositions for polyvinyl chloride resins comprising (a) at least one monoalkyltin mercaptocarboxylic acid ester having tetravalent tin linked to sulfur and through carbon to one alkyl group, (b) at least one dialkyltin compound having tetravalent tin linked to sulfur and through carbon to two alkyl groups, (c) barium carbonate, and (d) at least one organic salt acting as a liquifier for the carbonate. The weight ratio of barium to tin ranges from about 3:2 to about 3:100, preferably from 1:1 to 1:10. The weight of monoalkyltin component expressed as tin to the weight of dialkyltin component, expressed as tin, ranges from about 12:1 to 1:12, preferably 6:1 to 1:8.

There are also provided stabilized polyvinyl chloride resin compositions comprising PVC and a stabilizer composition comprising (a) at least one monoalkyltin mercaptocarboxylic acid ester having tetravalent tin linked to sulfur and through carbon to one alkyl group, (b) at least one dialkyltin compound having tetravalent tin linked to sulfur and through carbon to two alkyl groups, (c) barium carbonate, and (d) at least one organic salt acting as a liquifier for the carbonate. The stabilizer composition may be used in an amount of 0.1 to 5 parts, preferably 0.25 to 2.5 parts for 100 parts of PVC.

The monoalkyltin component of the stabilizer composition of this invention may be defined by the formula:

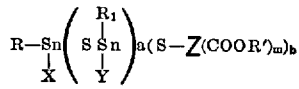

wherein $a$ is an integer of from zero to five.
$b$ is an integer from one to two.
$m$ is an integer of from one to two.
R and $R_1$ are hydrocarbon radicals having from one to about eighteen carbon atoms and preferably from one to eight carbon atoms.
X is selected from sulfide sulfur, and $SZ(COOR')_m$, and Y is selected from R and $SZ(COOR')_m$.
R' is an organic group derived from a monohydric or polyhydric alcohol of the formula $R'(OH)_n$, where $n$ is an integer of from one to about four, but is preferably one or two.
Z is a bivalent alkylene radical carrying the S group in a position alpha or beta to a COOR' group, and can contain additional free carboxylic acid, carboxylic ester, or carboxylic acid salt groups, and mercapto groups. The radical has from one to about five carbon atoms. Z accordingly includes methylene, ethylene, propylene, 1,3-butylene, 1,4-butylene, and 2,2-dimethylpropylene.

R and $R_1$ for example, may be methyl, ethyl, propyl, isopropyl, n-butyl, isobutyl, tert-butyl, sec-butyl, amyl, hexyl, n-octyl, 2-ethylhexyl, isooctyl, dodecyl, palmityl, myristyl, and stearyl and the like.

R' may be alkyl, alkylene, aryl, arylene, mixed alkyl-aryl, mixed aryl-alkyl, cycloaliphatic and heterocylic, and may contain from about one to about 30 carbon atoms and may also contain ester groups, alkoxy groups, hydroxyl groups, halogen groups and other inert substituents. Preferably, R' is derived from a monohydric alcohol containing from one to about fifteen carbon atoms, such as methyl, ethyl, propyl, s-butyl, n-butyl, isobutyl, octyl, isooctyl, 2-ethylhexyl, 2-octyl, lauryl alcohol, and the like; cyclic monohydric alcohols, such as cyclopentanol, cyclopentenol, cyclohexanol, cyclohexenol, 2-methyl-, 3-methyl-, and 4-methyl-cyclohexanol, 2-phenyl-cyclohexanol, 3,3,5-trimethyl cyclohexanol, cyclooctanol, cyclononanol, cyclodecanol, cyclododecanol or from a dihydric alcohol such as glycols containing from two to about fifteen carbon atoms, including ethylene glycol, propylene glycol, diethylene glycol, dipropylene glycol, tetramethylene glycol, neopentyl glycol and decamethylene glycol, 2,2,4-trimethyl pentane-diol, 2,2,4,4-tetramethyl cyclobutane-diol, cyclohexane-1,4-dimethanol, and polyols such as glycerine, sorbitol, pentaerythritol, di-pentaerythritol, trimethylol propane, and the like.

The alcohol $R'(OH)_n$ can be a single compound or a mixture of alcohols. The branched-chain primary alcohols made by the oxo process and known as isooctyl, isodecyl and isotridecyl alcohols are mixtures of isomers, but can be used as if they were single compounds. Other alcohol mixtures that may be used include, homologous mixtures of reaction products from ethylene oxide with alcohols, phenols, or carboxylic acids of the proper carbon content, and the like.

Examples of monoalkyltin mercaptocarboxylic acid esters or ester sulfides which may be used singularly or mixed with one another according to this invention are: methyltin tris(n-octylthioglycolate), n-butyltin tris(isooctylthioglycolate), n-butyltin tris(3,4,5-tri-methylhexyl thiomalate), n-octyltin tris(cyclohexyl 3-mercaptopropionate), ethyltin tris(ethyl 2-mercaptomyristate, isopropyltin tris(methoxyethyl 3-mercaptopropionate), n-propyltin tris(methyl 2-mercaptobenzoate), t-butyltin bis($C_{12}$—$C_{15}$-alkyl mercaptopropionate)octadecyl thioglycolate, isoamyltin tris(tetrahydrofurfuryl 3-mercaptopropionate), and the like.

Organotin mercaptocarboxylic acid ester sulfides that may be used according to this invention include: mono-n-butyltin monoisooctyl thioglycolate sulfide, mono-methyltin monoisooctyl thioglycolate sulfide, mono-n-octyltin monocyclohexyl thioglycolate sulfide, bis-(n-butyltin di-n-butylthiomalate)sulfide, bis-(n-octyltin di-2-ethylhexyl beta mercaptopropionate)sulfide, bis-(n-octyltin diisooctyl thioglycolate)sulfide as well as certain organotin mercaptocarboxylic acid ester sulfides disclosed by structural formulas in col. 6 and 7 of U.S. 3,565,930.

The dialkyltin component of the stabilizer composition is defined by the formula:

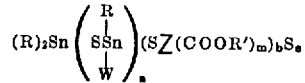

wherein $c$ is integer from zero to 1,
$a$, $b$, $m$, R, $R_1$, R' are as defined above and W is R, or $R_1$ or $SZ(COOR')_m$ Specifically for:

a dialkyltin mercapto carboxylic acid ester $a$ is 0, $b$ is 2, and $c$ is 0
a dialkyltin sulfide
  $a$ is 0, $b$ is 0, and $c$ is 1
a dialkyltin mercapto carboxylic acid ester sulfide
  $a$ is from 1 to about 5, $b$ is 2, and $c$ is 0.

The R and $R_1$ hydrocarbon groups linked to tin through carbon can be selected from alkyl groups having from one to eighteen carbon atoms, and can be the same or different.

Examples of dialkyltin compounds coming within the invention are dialkyltin sulfide such as dimethyl and diethyltin sulfide, dipropyltin sulfide, dibutyltin sulfide, dihexyltin sulfide, di-2-ethylhexyltin sulfide, di(isobutyl)tin sulfiide, di(n-octyltin)sulfide and di(disoamyl)tin sulfide, diisohexyltin sulfide, di(2-ethylbutyl)tin sulfide, and mixtures of these with one another and with other thioorganotin compounds defined herein.

Such sulfides can be prepared from the corresponding dialkyltin chloride and sodium sulfide. Additional methods of preparation are disclosed by R. Ingham et al., Chem. Reviews, vol. 60, 491–94 (1960).

Dialkyltin mercaptocarboxylic acid esters and estersulfides exemplifying the dialkyltin component of the inventive stabilizer compositions and which can be used singularly or mixed with one another are dimethyltin bis-(2-ethylhexylthioglycolate), di-n-dodecyltin bis(isoamyl thiolactate), di-isobutyltin bis(isodecyl 3-mercaptopropionate), di-n-hexyltin bis(isobutylthioglycolate), dicyclopentyltin bis(methyl 3-mercaptobutyrate), di-t-butyltin bis((2 - butoxyethoxy)ethyl thioglycolate), di-n-butyltin bis((2-hydroxyethoxy)ethyl 3-mercaptopropionate), di-nonyltin bis(glycerol monothioglycolate), di-n-butyltin isooctyl thioglycolate-isopropyl 2-mercaptostearate, dimethyltin bis(10 moles ethoxylated nonylphenol thioglycolate), bis-(di-n-butyltin monoisooctyl thioglycolate) sulfide, (di-n-octyltin monocyclohexyl thioglycolate)sulfide, bis-(di-n-butyltin mono(isooctyl thioglycolate)sulfide, bis-(di-n-octyltin monoisooctyl thioglycolate)sulfide, as well as certain organotin mercaptocarboxylic acid ester sulfides, structural formula in col. 6 and 7, of U.S. 3,565,930.

The above mercapto acid esters where not known, may be readily prepared by reaction of the mercaptocarboxylic acid ester with the corresponding organotin oxide chloride or with hydrocarbon stannonic acid. For a more complete explanation of process for making, and for additional examples of these mono and dialkyl mercaptoester compounds, see U.S. Patents Nos. 2,648,650 and 2,832,750-2 to Weinberg et al., 2,641,596 and 2,752,325 to Leistner, and 3,115,509 to Mack, and Canadian Pat. No. 649,989 to Mack.

The organotin mercaptocarboxylic acid esters containing different mercapto acid esters groups may be prepared by reacting the desired organotin oxide or chloride with a mixture of the mercapto acid esters, or by heating the different organotin esters together.

The organotin mercapto acid ester sulfides of the invention can be prepared by reacting diorganotin halides, monoorganotin halides or mixtures thereof, with less than stoichiometric amounts of mercapto carboxylic acid ester, and the resulting organotin mercapto acid ester halide intermediate may be further reacted with alkali or alkaline earth metal sulfides, such as sodium sulfides, to produce the organotin mercapto acid ester sulfide. For a more complete description of the process for making these organotin mercapto ester sulfides see U.S. Pat. No. 3,565,-930 to Kauder et al., col. 4, line 75 to col. 6, line 14.

The third component of the stabilizer compositions of this invention is barium carbonate and the fourth component is at least one organic salt usually in a low volatile organic liquid acting as a liquifying agent for the carbonate by itself or in combination with a volatile or nonvolatile polar compound.

The organic liquid can be a hydrocarbon oil, a plasticizer, an epoxy ester, etc. or a combination thereof.

The presence of the organic salt component of the stabilizer is essential to the homogeneous state of the complete stabilizer. From this it follows that the carbonate is characterized by the presence of an organic salt, the fourth component of the stabilizer composition, which in an organic solvent disperses the carbonate during or after its formation.

The proportions of carbonate to organic salt in this carbonate-organic salt combination is defined by the metal ratio which is a number greater than 2, i.e. the number of metal equivalents is greater than the number of equivalents of the organic acid residue of the organic salt. The metal ratio can be as high as 20 or even higher, limited only by the viscosity of the barium carbonate-organic salt combination.

The acid residue of the organic salt contains at least ten carbon atoms. There is no upper limit for the carbon content except that set by the availability of materials. Organic salts with as many as 150 carbon atoms in the acid residue give excellent results.

Preferred organic salts are salts from the class of barium phenolates and barium and calcium sulfonates. Typical sulfonic acids that can be used in form of their barium and calcium salts are the preferentially oil-soluble-petroleum sulfonic acids, commonly refered to as "mahogany acids," of about 350 to about 750 molecular weight, alkyl sulfonic acids, aryl sulfonic acids, and alkaryl sulfonic acids. Ilustrative of such sulfonic acids are dilauryl benzene sulfonic acid, lauryl cetyl benzene sulfonic acid, paraffin-substituted benzene sulfonic acids, polyolefin alkylated benzene sulfonic acids, such as polybutylene alkylated benzene sulfonic acids in which the polybutylene substituents have molecular weights of at least about 200, and preferably within the range of from about 300 to about 2500, and polypropylene alkylated benzene sulfonic acids in which the polypropylene substituents have a molecular weight of at least about 250, and preferably within the range of from about 290 to about 1500. Examples of other suitable sulfonic acids are monoparaffin wax-substituted naphthalene sulfonic acids, diparaffin wax-substituted phenol sulfonic acids, wax sulfonic acids, petroleum naphthalene sulfonic acids, diphenyl ether sulfonic acids, diphenyl ether disulfonic acids, naphthalene disulfide sulfonic acids, naphthalene disulfide disulfonic acids, diphenyl amine sulfonic acids, thiophene sulfonic acids, alpha-chloronaphthalene sulfonic acids, cetyl chlorobenzene sulfonic acids. Other usable oil-soluble sulfonic acids are well described in the art, for example, see U.S. 2,616,904; U.S. 2,626,207; and U.S. 2,767,209.

Phenols that can be used when the organic salt liquifying agent is a barium salt of a phenol, include alkylphenols such as sec. butylphenol, o-amylphenol, heptylphenol, caprylphenol, 6-t-butylxylenol, p-t-octyl phenol, dinonylphenol, dodecylphenol, and paraffin wax-alkylphenol, cycloalkylphenols such as o-cyclohexylphenol, p-cyclohexylphenol, and cyclooctyl-p-cresol; aralkylphenols such as 4-benzyl-o-cresol and ortho- and para-alphamethylbenzylphenols, and mixtures of the salts of these phenols with one another and with the sulfonate salts defined herein.

The organic salts may be accompanied by the free organic acid or phenol from which the salt is generated by reaction with the metal component thereof.

These barium carbonate-organic salt components of the stabilizer composition are visually clear liquids and leave no residue on filtration.

Many liquid barium carbonate-organic salt compositions are known in the art. There is an extensive patent literature teaching the preparation of such compositions. Unfortunately, the terminology employed is not uniform and such compositions are sometimes referred to as solutions of oil-soluble metal carbonates and sometimes as dispersions of oil insoluble metal carbonates. The compositions are often called "overbased" to indicate the ratio of total metal contained therein to the organic moiety is greater than the stoichiometric ratio of the neutral organic salt, i.e., the number of metal equivalents is greater than the number of equivalents of the acid residue.

Analytical techniques are available for determining the metal ratio and to characterize the liquid combinations of barium carbonate with organic salts. The total metal content can be determined by standard methods such as atomic absorption, or extraction into aqueous hydrochloric acid and complexometric titration of the metal in the extract. When the organic salt is a sulfonate, titration of a sample with perchloric acid according to ASTM method D–2896–70T measures only that part of the total metal content which is present as carbonate, while the part of the metal that is linked to the sulfonic acid, is not titrated in this determination. For barium, a bivalent metal, the metal ratio is then given by the expression:

$$2 \times \frac{\text{total equivalents of metal per g. of sample}}{\text{total equivalents of metal per g. of sample} - \text{equivalents metal per g. of sample by ASTM D-2896-70T titration}}$$

Alternatively, the metal present as carbonate is measured in terms of the combined carbon dioxide content and the metal ratio is given by the expression:

$$2 \times \frac{\text{total equivalents of metal/g. of sample}}{\text{total equivalents of metal/g. of sample} - \text{equivalents } CO_2/g.}$$

This method is applicable to both substituted phenates and sulfonates as the organic salt component of the stabilizers of this invention.

Liquid barium carbonates can be readily prepared by suspending, for instance, a barium base, e.g., oxide, hydroxide, alkoxide, carboxylate, phenate, etc. in a polar organic medium, carbonating the metal compound at elevated temperatures and transferring the carbonated product to a low volatile organic liquid containing an organic salt with or without subsequent hydrolysis and removal of volatiles before final filtration of the resulting liquid. The sequence of operations is not critical; the organic salts, for example, may be present already during the carbonation..

The polar organic medium used for the reaction can contain volatile and non-volatile polar compounds, called promoters in the literature. The volatile polar compounds are usually removed during the process and are not present in the finished product. A comprehensive overview of liquid organic combinations of barium carbonates, with organic salts, their ingredients and their methods of manufacture can be obtained from a selected group of patents, for example, P Asseff U.S. 2,616,905, F. Koft U.S. 3,544,463, and W. Le Suer U.S. 2,959,551.

A number of liquid barium carbonate compositions are commercially available and suitable for use in preparing the stabilized compositions of this invention. The following represents a non-limiting selection.

secure a storage stable homogeneous liquid stabilizer composition. Apparently some reaction occurs between the organotin and the carbonate-organic salt combination.

EXAMPLES 1-4

Barium carbonate-organic salt compositions are blended with a mixture of n-butyltin tris(isooctyl thioglycolate) and di-n-butyltin bis(isooctylthioglycolate). For comparison, the mixture of mono- and dialkyltin mercaptocarboxylic acid esters is used by itself (Control A) and also blended with other barium containing organic solutions (Control B). The samples are subjected to various conditions of heat treatment and tested for storage stability in open containers in an environmental chamber kept at 77±4° F. and 70% relative humidity. The proportions of ingredients in the stabilizer compositions (Example 1-4) are:

n-butyltin tris(isooctyl thioglycolate) (15.2% Sn) 40 parts by weight
di-n-butyltin bis(isooctylthioglycolate) (18.6% Sn) 30 parts by weight
barium composition (14% Ba) 30 parts by weight The entire composition contains 11.7% tin and 4.2% barium by weight.

Failure in the storage test is evidenced by the appearance of a precipitate, surface skin, or gelation.

Results of the test are shown in Table 1.

TABLE 1

| Barium composition | | Heat treatment | Appearance | Days to failure |
|---|---|---|---|---|
| Control: | | | | |
| A | None | None | Colorless liquid | 30 (unchanged). |
| A | do | 1 hr., 266° F | Yellow liquid | 3 (precipitate). |
| B | Barium nonylphenate [1] | None | Wine red liquid | 1 (skin). |
| B | do.[1] | 1 hr., 266° F | do | Do. |
| Example: | | | | |
| 1 | Barium carbonate-barium nonylphenate [2] | None | Cloudy tan liquid | 10 (precipitate). |
| 2 | do.[2] | 1 hr., 266° F | Wine red liquid | 30 (unchanged). |
| 3 | Barium carbonate-barium petroleum sulfonate (metal ratio 4.9) | None | Cloudy tan liquid | 12 (precipitate). |
| 4 | do | 1 hr., 266° F | Wine red liquid | 30 (unchanged). |

[1] Prepared in solvent mixture of polydodecyl benzene and 2-ethoxyethanol.
[2] Reaction product of the barium nonyl phenate solution (control B) with barium hydroxide and carbon dioxide at 300° F. to a metal ratio of 9.0 and adjusted to 14% barium with solvent mixture.

The results of the above experiments show that the stabilizer composition of monoalkyltin and dialkyltin mercaptocarboxylic ester with barium carbonate and organic salt are homogeneous and storage stable. The heat treatment of these compositions further improve their storage stability. The alkyltin mixture without barium, on the other hand, is adversely affected by heat treatment, and the blends containing a barium organic salt without carbonate is relatively unstable with or without heat treatment.

EXAMPLES 5-9

A series of stabilizer compositions are prepared by blending the ingredients and heating the resulting mixtures at 300° F. for 2 hours, as summarized on Table 2. Quantities of ingredients are given in parts by weight. For convenience in weighing and compounding, the tin content

| Material | Supplier | Typical properties |
|---|---|---|
| Barium carbonate-barium petroleum sulfonate | Sonneborn Division Witco Chemical Corp. New York, N.Y. | Base No. 68, 14.1% Ba, metal ratio 4.9. |
| Barium carbonate-barium polyalkylbenzene sulfonate | Conoco Chemicals Continent. Oil Corp. Saddle Brook, N.J. | Base No. 65, 14% Ba, metal ratio 4.6. |
| Barium carbonate-barium petroleum sulfonate | do | Base No. 190, 27% Ba, metal ratio 14.6. |
| Barium carbonate-barium alkyl phenate | Lubrizol Corp. Wickcliffe, Ohio | 26% Ba (also 21% and 23% Ba grades). |

The stabilizer compositions are prepared by mixing together the organotin and barium components, and heating until a homogeneous storage stable liquid is obtained.

Heating of the mixture is often necessary in order to of all the blends is adjusted to 12.9% tin by weight by dilution with di-2-ethylhexyl phthalate (DOP) as required. The DOP is found to have no effect of its own on the heat stabilizing effectiveness of the blends.

TABLE 2

|  | Example | | | | | Control | | | | |
| --- | --- | --- | --- | --- | --- | --- | --- | --- | --- | --- |
|  | 5 | 6 | 7 | 8 | 9 | E | F | G | H | I | J |
| N-butyltin tris (isooctylthioglycolate) | 70 | 55 | 40 | 25 | 10 | 85 | 100 | | | | |
| Dimethyltin bis (isooctylthioglycolate) | 10.9 | 21.3 | 32.1 | 42.6 | 53.5 | | | 60.4 | 100 | | |
| Barium carbonate-barium nonylphenate (26% Ba, metal ratio 8.7) | 15 | 15 | 15 | 15 | 15 | 15 | | 15 | | 15 | 100 |
| Diluent (DOP) | 4.1 | 8.7 | 12.9 | 17.4 | 21.5 | | 24.6 | | 85 | |
| Total tin, weight percent | 12.9 | 12.9 | 12.9 | 12.9 | 12.9 | 12.9 | 15.2 | 12.9 | 21.4 | 0 | 0 |
| Sn/Ba, weight ratio | 3.3 | 3.3 | 3.3 | 3.3 | 3.3 | 3.3 | | 3.3 | | | |
| Monoalkyltin, percent Sn by weight | 10.6 | 8.4 | 6.1 | 3.8 | 1.5 | 12.9 | 15.2 | | | | |
| Dialkyltin, percent Sn by weight | 2.3 | 4.5 | 6.8 | 9.1 | 11.4 | | | 12.9 | 21.4 | | |
| Sn (monoalkyl) wt. ratio/Sn (dialkyl) | 4.6 | 1.9 | 0.90 | 0.42 | 0.13 | | | | | | |

The stabilizer compositions of Examples 5–9 are wine-red homogeneous liquids stable at room temperature for at least one month. Each of the stabilizer compositions described in Table 2 was tested in a polyvinyl chloride resin composition prepared by a conventional procedure. The stabilizer is blended with the polyvinyl chloride resin, on a two roll mill, at 320° F., a temperature at which the mix is fluid and thorough blending facilitated, milling the resin composition for 2–3 minutes, a time sufficient to form a homogeneous mass. After the mass is uniform it is sheeted off in the usual way.

The heat stability of these resin compositions is determined in an air circulating oven at 400° F. This test temperature appears to be unique, as the prior art evaluates heat stabilizers at temperatures below 400° F. the high test temperature is in line with the increasingly high temperatures used in line with the industrial processing to speed up extrusion and molding operation. A sufficient number of rectangular strips are cut off from each sheet and heated in the oven at 400° F. for 40 minutes. Strips of each formulation are removed at five minute intervals and affixed to cards to show the progressive heat deterioration.

The heat degradation is evaluated by the amount of color formed, i.e., the extent of discoloration relative to the controls.

The discoloration is rated visually by color and recorded, according to the following abbreviations.

| | |
| --- | --- |
| a | Amber. |
| w | White. |
| g | Gray. |
| t | Tan. |
| pk | Pink. |
| o | Orange. |
| y | Yellow. |
| b | Brown. |
| r | Red. |
| ch | Chocolate. |
| bl | Black. |
| pur | Purple. |
| c | Colorless. |
| p | Pale. |
| v | Very. |
| l | Light. |
| d | Dark. |
| * | With brown edges. |
| † | With gas bubbles. |
| ** | With spots. |
| *** | With dark spots. |

The formulation of the PVC resin compositions is as follows:

Ingredients: Parts by weight
Polyvinylchloride (High mol. K=68) _____ 100
Methyl methacrylate - ethylacrylate copolymer (K–120N) _____ 1.0
Titanium dioxide _____ 1.0
Paraffin wax (Aristo wax 160) _____ 1.0
Calcium stearate _____ 0.8
Stabilizer composition (from Table 2) _____ 1.5

The appearance of the samples resulting from the stability test is given in Table 3.

TABLE 3

| Time at 400° F. (minutes) | Example | | | | | Control | | | | | |
| --- | --- | --- | --- | --- | --- | --- | --- | --- | --- | --- | --- |
| | 5 | 6 | 7 | 8 | 9 | E | F | G | H | I | J |
| 0 | w | w | w | w | w | w | w | vpy | w | lpk | pk |
| 5 | w | w | w | w | vpy | vpy | vpy | py | py | b | b |
| 10 | vpy | vpy | vpy | vpy | vpy | py | vpy | py | py | b | b |
| 15 | vpy | vpy | vpy | vpy | vpy | y | py | py | y | b | b |
| 20 | py | py | vpy | vpy | vpy | g | y | y | y* | b | b |
| 25 | y | py | py | py | py | g | g | o | o | b | b |
| 30 | g | y | y | y | y | g | g | b | b | b | b |
| 35 | g | lg | lg | lg | o | g† | g† | b | b | b | b |
| 40 | g | g | g | g | b | g† | g† | b | b | b | b |

The stabilizer compositions of Examples 5–9 are clearly superior to those in controls E through H, in both the critical early heating periods are representative of the heat history in production, and also in avoiding the appearance of gas bubbles on more extensive degradation, thus providing an element of safety in case of an emergency. It is particularly important to note that the compositions of Examples 5–9 are superior to control stabilizers employing a single organotin compound and having a greater tin content that the stabilizer compositions of the invention (controls F and H). The stabilizer compositions of Examples 5–9 are also superior to compositions having the same tin and barium content but employing only a single alkyltin component (controls E and G). At the same time, the synergistic interaction between the two alkyltin and two barium components of the compositions of Examples 5–9 is not evidenced between the barium and single alkyltin components of the control compositions E and G, and the barium components alone have hardly any stabilizing effectiveness (controls I and J).

Accordingly, an unexpected synergistic interaction of the monoalkyltin mercaptocarboxylic acid ester, dialkyltin mercaptocarboxylic acid ester, and barium carbonate-barium nonyl phenate components in the stabilizer composition of the invention is demonstrated.

EXAMPLES 10–14

A series of stabilizer compositions is prepared from n-butyltin tris(isooctyl thioglycolate), di-n-butyltin sulfide, and barium carbonate-barium nonyl phenate (26% Ba, metal ratio 5.7) ingredients. As in Examples 5–9, all blends are heated two hours at 300° F. and the tin content of the blends is adjusted to 12.9% with DOP. Quantities of ingredients in parts by weight are shown in Table 4.

TABLE 4

| | Example | | | | | Control | | | | | |
|---|---|---|---|---|---|---|---|---|---|---|---|
| | 10 | 11 | 12 | 13 | 14 | E | F | K | L | I | J |
| N-butyltin tris (isooctylthioglycolate) | 70 | 55 | 40 | 25 | 10 | 55 | 100 | | | | |
| Dibutyltin sulfide | 5.1 | 10.1 | 15.1 | 20.2 | 25.3 | | | 28.7 | 100 | | |
| Barium carbonate-barium nonyl phenate (26% Ba, metal ratio 8.7) | 15 | 15 | 15 | 15 | 15 | 15 | | 15 | | 15 | 100 |
| Diluent (DOP) | 9.9 | 19.9 | 29.9 | 39.8 | 49.7 | | | 56.3 | | 85 | |
| Total tin, weight percent | 12.9 | 12.9 | 12.9 | 12.9 | 12.9 | 12.9 | 15.2 | 12.9 | 44.9 | 0 | 0 |
| Sn/Ba, weight ratio | 3.3 | 3.3 | 3.3 | 3.3 | 3.3 | 3.3 | | 3.3 | | | |
| Monoaklyltin, percent Sn by weight | 10.6 | 8.4 | 6.1 | 3.8 | 1.5 | 12.9 | 15.2 | | | | |
| Diaklyltin percent Sn by weight | 2.3 | 4.5 | 6.8 | 9.1 | 11.4 | | | 12.9 | 44.9 | | |
| Monoalkyltin dialkyltin wt. ratio | 4.6 | 1.9 | 0.90 | 0.42 | 0.13 | | | | | | |

The stabilizer compositions of Examples 10–14 are wine red homogeneous liquids stable for at least one month.

Polyvinyl chloride resin compositions are prepared with each stabilizer composition described on Table 4. The test formulation and procedure are as described in Examples 5–9. The appearance of the samples resulting from the heat stability test at 400° F. is given in Table 5.

nents being used in various proportions. For comparison, controls M and N are made up with the barium and antioxidant ingredients and a single alkyltin compound.

All compositions are heated 1 hour at 266° F. and adjusted to the same tin content by dilution with DOP. They are wine-red, storage stable liquids.

The proportions of ingredients in each of these stabilizer compositions are shown in Table 6.

TABLE 5

| Time at 400° F. (minutes) | Example | | | | | Control | | | | | |
|---|---|---|---|---|---|---|---|---|---|---|---|
| | 10 | 11 | 12 | 13 | 14 | E | F | K | L | I | J |
| 0 | w | w | w | w | w | w | w | w | py | lpk | pk |
| 5 | w | w | w | vpy | vpy | vpy | vpy | py | y | b | b |
| 10 | vpy | vpy | vpy | vpy | vpy | vpy | vpy | py | y | b | b |
| 15 | vpy | vpy | vpy | vpy | py | y | py | y | y | b | b |
| 20 | py | py | vpy | py | py | g | y | lt | lb | b | b |
| 25 | y | py | py | y | y | g | g | b | b | b | b |
| 30 | g | y | y | lt | lt | g | g | b | b | b | b |
| 35 | g | lg | lg | b | b | g↑ | g↑ | b | b | b | b |
| 40 | g | g | g | b | b | g↑ | g↑ | b | b | b | b |

The stabilizer compositions of Examples 10–14 are clearly superior to those in controls E, F, I, J, K, and L in both the critical early heating periods representative of the heat history in production, and also in avoiding the appearance of gas bubbles on more extensive degradation, thus providing an element of safety in case of an emergency. It is particularly important to note that the compositions of Examples 10–14 are superior to control stabilizers employing a single organotin compound and having a greater tin content than the stabilizer composition of the invention (controls F and L). The stabilizer compositions of Examples 10–14 are also superior to compositions having the same tin and barium contents but employing only a single alkyltin component (controls E and K). At the same time, the synergistic interaction observed between the two alkyltin and two barium components of the composition of Examples 10–14 is not observed between the barium and single alkyltin components of the control compositions E and K, and the barium components alone have hardly any stabilizing effectiveness (controls I and J). Accordingly, an unexpected synergistic interaction of the monoalkyltin mercaptocarboxylic ester, dialkyltin sulfide and barium carbonate-barium nonyl phenate components in the stabilizer composition of the invention is demonstrated.

EXAMPLES 15–19

A series of stabilizer compositions are prepared from n-butyltin (isooctyl thioglycolate) sulfide, bis(dimethyltin isotridecylmercaptopropionate) sulfide, barium carbonate-barium petroleum sulfonate (27% barium, metal ratio 14.2) and a hindered phenol antioxidant. In Examples 15–19, these compositions contain all the above ingredients, with the monoalkyltin and dialkyltin compo-

TABLE 6

| | Example | | | | | Control | |
|---|---|---|---|---|---|---|---|
| | 15 | 16 | 17 | 18 | 19 | M | N |
| N-butlytin (isooctyl thioglycolate) sulfide | 37.2 | 28.0 | 19.1 | 11.9 | 5.9 | 42.3 | |
| Bis (dimethyltin isotridecylmercaptopropionate) sulfide | 5.9 | 16.7 | 27.1 | 35.4 | 42.3 | | 49.3 |
| Barium carbonate-barium petroleum sulfonate (metal ratio 14.2) | 25 | 25 | 25 | 25 | 25 | 25 | 25 |
| Di-t-butyl-p-cresol | 5 | 5 | 5 | 5 | 5 | 5 | 5 |
| Diluent (DOP) | 26.9 | 25.3 | 23.8 | 27.7 | 21.8 | 27.7 | 20.7 |
| Total tin, weight percent | 12.9 | 12.9 | 12.9 | 12.9 | 12.9 | 12.9 | 12.9 |
| Sn/Ba, weight ratio | 1.9 | 1.9 | 1.9 | 1.9 | 1.9 | 1.9 | 1.9 |
| Monoalkyltin, percent Sn by weight | 11.4 | 8.6 | 5.8 | 3.6 | 1.8 | 12.9 | |
| Dialkyltin, percent Sn by weight | 1.5 | 4.3 | 7.1 | 9.3 | 11.1 | | 12.9 |
| Monoalkyltin/dialkyltin, weight ratio | 7.4 | 2.0 | 0.83 | 0.39 | 0.16 | | |

Polyvinyl chloride compositions containing each of the stabilizer compositions shown in Table 6 are prepared and tested according to the procedure described in Examples 5–9. The formulation is as follows:

Ingredients: Parts by weight
- Vinyql chloride homopolymer ($k=65$) _____ 100
- Methyl methacrylate-ethyl acrylate copolymer _____ 1.5
- Methyl methacrylate - butadiene - styrene copolymer _____ 12.0
- Titanium dioxide _____ 2.0
- Calcium stearate _____ 0.5
- Butylene glycol ester of montan wax acid (wax E) _____ 0.25
- Stabilizer _____ 1.0

The appearance of the samples resulting from the heat stability test in the 400° F. oven is shown in Table 7.

TABLE 7

| Time at 400° F. (minutes) | Example | | | | | Control | |
|---|---|---|---|---|---|---|---|
| | 15 | 16 | 17 | 18 | 19 | M | N |
| 0 | w | w | w | w | w | w | w |
| 5 | w | w | w | w | w | w | vpy |
| 10 | vpy | vpy | vpy | vpy | vpy | vpy | vpy |
| 15 | vpy | vpy | py | py | py | y | py |
| 20 | py | vpy | py | py | py | lg | lo* |
| 25 | y | y | y | y | y | lg | rb |
| 30 | lg | lg | lo | lo | lo | g | b |
| 35 | g | g | lb* | lb | lb | g | b |
| 40 | g | g | b | b | b | g | b |

The results of the heat stability test show that the expected good heat stability obtained with the individual monoalkyltin or dialkyltin mercapto ester sulfides combined with antioxidant and barium components (controls M and N) is considerably improved without any increase in tin content when in accordance with this invention the barium carbonate, barium petroleum sulfonate, as well as the optional hindered phenol are combined with both a monoalkyltin mercaptoester sulfide and a dialkyltin mercaptocarboxylic acid ester sulfied as in Examples 15–19.

EXAMPLE 20

Plasticized calendering resin compositions are prepared as follows:

Ingredients: Parts by weight
Polyvinyl chloride homopolymer (K=68) --- 100
Di-2-ethylhexyl phthalate -------------------- 40
Epoxy soybean oil ------------------------ 5
Stabilizer ------------------------------- 1.0
Montana wax acid butylene glycol diester (wax E) ------------------------------- 0.25

The procedure in preparing and testing the samples for heat stability at 400° F. is the same as in the preceding examples.

The stabilizer composition used is the composition of Example 3, which contained 11.7% tin and 4.2% barium, and for comparison di-n-butyltin bis(isooctyl thioglycolate) containing 18.6% tin (control O) and barium carbonate-barium nonyl phenate containing 14% barium (control P). The appearance of the samples resulting from the heat stability test is shown in Table 8.

TABLE 8

| Time at 400° F. (minutes) | Example 20 | Control | |
|---|---|---|---|
| | | O | P |
| 0 | c | c | pk |
| 5 | c | vpy | lr |
| 10 | vpy | py | dr |
| 15 | py | py | b |
| 20 | y | y | b |
| 25 | y | y | b |
| 30 | y | a | b |
| 35 | y | o | b |
| 40 | a | do | b |

The results show that when used in equal weight concentration, the liquid stabilizer composition combining the monobutyl and dibutyltin isooctyl thioglycolate with barium carbonate and barium nonyl phenate inhibits discoloration of the plasticized PVC for approximately twice as long as dibutyltin bis(isooctyl thioglycolate) which contains almost twice as much tin (18.6% against 11.7%) and which was long considered the most powerful stabilizer known. Thus 10 minutes heating of the composition of Example 20 gives the same color reached by control O in 5 minutes, thus providing a doubling of the heat stability afforded by control O. The barium carbonate-barium nonyl phenate composition by itself has little or no stabilizing effectiveness. This makes the synergistically enhanced stabilizing effectiveness of the combination in the same total amount surprising indeed.

EXAMPLE 21

In order to show the effectiveness of stabilizer compositions of this invention under dynamic conditions where the plastic mass is subjected to mechanical shear along with the influence of heat and air, mill stability tests are carried out. A double laboratory batch of each PVC composition (200 grams of PVC and all other ingredients in proportion) is prepared and fused on a two-roll mill. The fused stock is kept on the mill at 358° F. until failure (severe color development or sticking to the roll) is observed. At 5 minute intervals, the stock temperature is measured with a pyrometer and a small sample is removed, flattened with molding pliers and attached to a record card.

The formulation is:

Ingredients: Parts by weight
Polyvinyl chloride (high mol. K=68) ------- 100
Methyl methacrylate - ethylacrylate copolymers (K120) ------------------------------- 1.0
Titanium dioxide ------------------------ 1.0
Paraffin wax (Aristo wax 160) ------------- 1.0
Calcium stearate ------------------------ 0.8
Stabilizer composition ------------------- 0.5

The ingredients of the stabilizer compositions used are shown in Table 9 and the stock temperatures measured as well as the appearance of the samples removed during the test are shown in Table 10.

TABLE 9

| | Ex. 21 | Control | | |
|---|---|---|---|---|
| | | Q | R | S |
| n-Butyltin tris (isooctyl thioglycolate) | 43 | 100 | | |
| Di-n-butyltin bis(isooctyl thioglycolate) | 17 | | 100 | |
| Barium carbonate barium nonyl phenate (26% Ba, metal ratio 8.7) | 40 | | | 100 |

TABLE 10

[Mill stability at 358±2° F. of the mill, stock temperature ° F. is given in parenthesis]

| Time at 358° F. (minutes) | Ex. 21 | Control | | |
|---|---|---|---|---|
| | | Q | R | S |
| 0 | w (360) | w (360) | w (360) | pk |
| 5 | w (360) | w (360) | vpy (360) | r |
| 10 | w (360) | w (360) | vpy (360) | d r |
| 15 | vpy (358) | vpy (362) | py (358) | dk r-stuck |
| 20 | vpy (358) | py (365) | py (360) | |
| 25 | py (358) | g-b (372) | y (369) | |
| 30 | lo (356) | g-b (381) stuck | lo (360) | |
| 35 | lo (356) | | o (365) | |
| 40 | lo (356) | | lo-b (370) | |
| 45 | lo (358) | | lb (376) | |
| 50 | lo (360) | | lg (376) | |
| 55 | lo (360) | | lb (383) | |
| 60 | lt (360) | | lb (390) | |
| 65 | lt (362) | | b (392) | |
| 70 | lt (367) | | b (394) | |
| 75 | lt (372) | | b (396) | |
| 80 | lb (379) | | db (396) | |

The results of the mill stability test correlate with those of the oven tests and show that the results of the oven test can be used to gauge the usefulness of the stabilizer compositions for processes carried out under mechanical shear, such as extrusion and calendering.

Here as in the preceding examples, the stabilizer composition of the invention is considerably more effective than any of its ingredients, even though the tin content of the Example 21 composition is less than that of the control compositions Q and R.

The lower stock temperatures observed with the stabilizer composition of this invention while keeping the mill at 358°±2° F. indicate the additional and unexpected desirable property of minimizing the "frictional heat build-up" in the plastic stock.

EXAMPLE 22

In order to demonstrate the effectiveness of the invention in a plastisol formulation, the following experiment is carried out.

Dispersion grade PVC is stirred with di-2-ethylhexyl phthalate plasticizer and stabilizer at room temperature using an electric hand drill fitted with a propeller type stirrer. The resulting milky dispersions are freed of contacted air in an evacuated desiccator overnight, poured on glass plates and fused in a circulating air oven at 400° F. for 3 minutes. The resulting clear sheet which is 0.5 mm. thick is cut in strips, which are aged in the oven at 400° F. for the indicated time. Samples are withdrawn at 5 minute intervals and examined for color changes as evidence of degradation.

The formulation is:

| Ingredients: | Parts by weight |
|---|---|
| Dispersion grade PVC (Geon 121 product of B. F. Goodrich Chemical Company) | 100 |
| Di-2-ethylhexyl phthalate | 60 |
| Isooctyl epoxystearate | 10 |
| Stabilizer composition | 2.0 |

The ingredients of the stabilizer compositions used in the tests are shown below:

TABLE 11

| | Ex. 22 | Control T | Control U | Control V |
|---|---|---|---|---|
| Mono-n-butyltin tris (isoocytl thiogylcolate) | 45 | 95 | | |
| Di-n-butyltin di (isooctyl thioglycolate) | 25 | | 95 | |
| Zinc 2-ethylhexoate | 5 | 5 | 5 | 5 |
| Barium carbonate-barium petroleum sulfonate (percent Ba=14.1, molar ratio 4.9) | 25 | | | 95 |

The results of the heat stability test are shown in Table 12.

TABLE 12

| Time at 400° F. (minutes) | Ex. 22 | Control T | Control U | Control V |
|---|---|---|---|---|
| 0 | c | c | c | lpk |
| 5 | c | c | c | lr |
| 10 | c | vpy | vpy | dr |
| 15 | vpy | vpy-bl** | vpy-b** | b |
| 20 | vpy | vpy-bl** | py-b** | b |
| 25 | py | bl | y-b** | b |
| 30 | lb | bl | lb | bl |
| 35 | b | bl | db | bl |
| 40 | b | bl | db | bl |

In the above plastisols, the stabilizer composition of Example 22 is clearly superior to those of controls T, U, and V even though the latter supply considerably more tin or barium than the stabilizer according to this invention.

EXAMPLES 23–30

Additional examples of homogeneous liquid stabilizer compositions prepared in accordance with this invention from various monoalkyltin mercaptocarboxylic acid esters, dialkyltin compounds, and barium carbonate-barium or calcium organic salt combinations are shown in Table 13 along with their ingredients and experimental conditions.

TABLE 13

| Example No. | Components | Metal ratio (M.R.) | Parts by weight | Mixing time (hrs.) | Mixing temp., °F. |
|---|---|---|---|---|---|
| 23 | Methyltin tris (tetrahydrofurfuryl thioglycolate) | | 32 | 3 | 257 |
| | Di-n-butyltin bis(n-butyl thiomalate) | | 20 | | |
| | Barium carbonate-barium dodecylphenate (25% Ba) | 12.9 | 48 | | |
| 24 | n-Octyltin (2-ethylhexyl 3-mercapto propionate) sulfide | | 15 | 4 | 122 |
| | Dimethyltin bis (2-ethylhexyl 3-mercapto propionate) | | 42 | | |
| | Barium carbonate-barium "wax alkyl" phenate | 3.9 | 23 | | |
| | Di(2-ethylhexyl) phenyl phosphite | | 20 | | |
| 25 | n-Butyltin tris (isodecyl 2-mercaptopropionate) | | 64 | 3 | 149 |
| | Di-n-octadecyltin sulfide | | 27 | | |
| | Barium carbonate-calcium polydodecylbenzene sulfonate | 7.2 | 7 | | |
| | Bis(4-hydroxy-3,5-di-t-butyl) sulfide | | 2 | | |
| 26 | n-Hexyltin tris (phenoxyethyl thioglycolate) | | 42 | 4 | 194 |
| | Dimethyltin bis (p-dodecyl phenol 6 mol. ethoxylate ester of thioglycolic acid) | | 20 | | |
| | Barium carbonate-barium (petroleum sulfonate-butylphenate) | 4.0 | 23 | | |
| | Epoxidized linseed oil | | 15 | | |
| 27 | n-Dodecyltin (isooctyl thioglycolate) sulfide | | 25 | 2 | 167 |
| | Di-n-butyltin bis(isooctyl thioglycolate) | | 51 | | |
| | Di-n-butyltin oxide-diisooctyl adipate complex | | 7 | | |
| | Stannous oleate | | 3 | | |
| | Barium carbonate-calcium mahogany sulfonate | 9.35 | 14 | | |
| 28 | N-octyltin tris (2-ethoxyethyl thioglycolate) | | 15 | 4 | 257 |
| | Di-n-octyltin bis(2-ethoxyethyl thioglycolate) | | 60 | | |
| | Barium carbonate-barium petroleum sulfonate | 14.2 | 23 | | |
| | n-Octyldecyl 3,5-di-t-butyl 4-hydroxyphenyl propionate | | 2 | | |
| 29 | n-Butyltin tris (propylene glycol mono-3-mercapto propionate) | | 35 | 3 | 149 |
| | Dimethyltin di(n-octadecyl thioglycolate) | | 45 | | |
| | Barium carbonate-barium nonylphenate | 8.7 | 16 | | |
| | Dilauryl thiodipropionate | | 4 | | |
| 30 | Isobutyltin tris (n-heptyl thioglycolate) | | 33 | 2 | 221 |
| | Di-2-ethylhexyltin bis(n-heptyl thioglycolate) | | 33 | | |
| | Barium carbonate-barium dicyclohexylphenate | 6.4 | 4 | | |
| | Tris(nonylphenyl) phosphite | | 35 | | |

The stabilizer compositions of the invention may be employed with other conventional polyvinyl chloride resin heat stabilizers.

Metal-containing heat stabilizers that may be used include organotin carboxylates, complexes of dibutyltin oxide with organic esters such as diisooctylphthalate, propylene dioleate and dodecyl adipate; zinc and stannous tin salts of medium or high molecular weight fatty acids, for example, zinc 2-ethylhexoate, zinc stearate, stannous benzoate, stannous neodecanoate, and stannous oleate. Non-metallic heat stabilizers include phenols, organic phosphites, thiodipropionic acids or esters and epoxy compounds. A comprehensive disclosure of representatives of each of these classes of compounds is found in U.S. Pat. 3,398,114 issued Aug. 20, 1968, and is incorporated here by reference. A particularly preferred class of auxiliary stabilizers are the hindered phenols, representatives of which are described in A. Hecker (U.S. 3,479,309 col. 8, line 13 through col. 9, line 37 which is incorporated here by reference).

A total of from 0.1 to 5 parts preferably 0.25 to 2.5 parts by weight of the entire stabilizer composition may be used for each 100 parts by weight of the resin. More stabilizer composition than indicated above may be used but there is no particular advantage in using such increased amounts.

The invention is applicable to any polyvinyl chloride resin. The term PVC, as used herein, includes not only polyvinyl chloride homopolymers but also afterchlorinated polyvinyl chlorides as a class, for example, those disclosed in British Pat. No. 893,288, and also copolymers of vinyl chloride in a major proportion and other copolymerizable monomers in a minor proportion, such as copolymers of vinyl chloride and vinyl acetate, copolymers of vinyl chloride with maleic or fumaric acid or esters, and copolymers of vinyl chloride with styrene. The invention is also applicable to mixtures of polyvinyl chloride in a major proportion with a minor proportion of other synthetic resins such as chlorinated polyethylene or a copolymer of acrylonitrile, butadiene and styrene, and the like.

The invention is applicable to rigid, semi-rigid and plasticized PVC formulations. Rigid resins contain less than 10% plasticizer, semi-rigids from about 10% to about 15% plasticizer, and plasticized resins from 15% to 50% or more of plasticizer.

For semi-rigid and plasticized formulations, there may be incorporated plasticizers such as phthalate, sebacate, adipate, phosphate, and fatty acid esters having from 16 to 150 carbon atoms. For a thorough discussion of plasticizers, see Sarvetnick, op. cit. p. 67–87.

A small amount, usually not more than 1.5% of a parting agent or lubricant, may also be included. Typical parting agents are the higher aliphatic acids, and salts having twelve to twenty-four carbon atoms, such as stearic acid, lauric acid, palmitic acid and myristic acid, lithium stearate and calcium palmitate, mineral lubricating oils, petrolatum, polyethylene, paraffin wax, and ester waxes such as stearyl stearate, cetyl palmitate and glycol esters of oxidized Montan wax esters of which the 1,4-butanediol ester is typical.

Polymeric modifiers, for improving the toughness or impact-resistance of unplasticized resins, may be added to the resin compositions stabilized by the present invention in minor amounts of usually not more than 10%. Examples of such polymeric modifiers include chlorinated polyethylene, ABS polymers, polyacrylate-butadiene graft copolymers, and methyl methacrylate-ethyl acrylate copolymers.

For some applications it may be desirable to include a filler in the PVC resin, i.e. to act as an extender, increase hardness, and hot deformation resistance, or to achieve some degree of reinforcing, etc. Among the fillers calcined clays and calcium carbonate are widely used; they are inert and have no effect on the heat stability of PVC.

If color has to be imparted to the resin, pigments may be added, without affecting the stabilizer's effectiveness when selected judiciously.

For the commercial processing of rigid polyvinyl chloride, the stabilizer is conveniently mixed with all or a portion of the polymer to be stabilized with vigorous agitation under such conditions of time and temperature that the stabilizer is sufficiently imbibed by the polymer to produce a dry, free-flowing powder. The well-known Henschel mixer is well suited to this procedure.

The stabilizer compositions of this invention are advantageously used in resins formed into many useful structural members including extruded polyvinyl chloride pipe useful for water, brine, crude petroleum, gasoline, natural and manufactured fuel gas, and domestic and industrial wastes; flat and corrugated profiles for the construction industry, blow-molded bottles and the like.

Having regard to the foregoing disclosure, the following is claimed as the inventive and patentable embodiments thereof:

1. A homogeneous stabilizer composition liquid at ambient temperature, for increasing the resistance of polyvinyl chloride resins to early discoloration when heated to 400° F. comprising:
   (a) at least one monoalkyl tin mercaptocarboxylic acid ester compound having a tetravalent tin atom linked directly to sulfur and to one alkyl group of from 1–18 carbons;
   (b) at least one dialkyltin compound having a tetravalent tin atom linked directly to sulfur and to two alkyl groups of from 1–18 carbons;
   (c) barium carbonate; and
   (d) at least one organic salt selected from the class consisting of barium sulfonates and barium phenates, wherein the weight ratio of barium to tin is from about 3:2 to about 3:100, and the weight ratio of monoalkyltin component to the dialkyltin component is from about 12:1 to 1:12.

2. A process for preparing a storage stable polyvinyl chloride stabilizer composition comprising mixing for 1 to about 4 hours at about 100° to about 300° F. until visual homogeneity is obtained:
   (a) at least one monoalkyltin mercaptocarboxylic acid ester compound having a tetravalent tin atom linked directly to sulfur and to one alkyl group of from 1–18 carbons;
   (b) at least one dialkyltin compound having a tetravalent tin atom linked directly to sulfur and to two alkyl groups of from 1–18 carbons;
   (c) barium carbonate;
   (d) at least one organic salt selected from the class consisting of barium sulfonates, calcium sulfonates and barium phenates, wherein the weight ratio of barium to tin is from about 3:2 to about 3:100, and the weight ratio of monoalkyltin component to the dialkyltin component is from about 12:1 to 1:12.

3. A process for preparing a storage stable PVC stabilizer composition according to claim 2 wherein n-butyltin tris(isooctyl thioglycolate), di-n-butyltin bis(isooctyl thioglycolate) and barium carbonate-barium petroleum sulfonate are heated until visual homogeneity is obtained.

4. A process for preparing a storage stable PVC stabilizer composition according to claim 2 wherein n-butyltin tris(isooctyl thioglycolate), dibutyltin sulfide and barium carbonate-barium nonyl phenate are heated until visual homogeneity is obtained.

5. A process for preparing a storage stable PVC stabilizer composition according to claim 2 wherein octyltin (2-ethylhexyl 3-mercaptopropionate)sulfide, dimethyltin bis(2-ethylhexyl 3-mercaptopropionate), barium carbonate-barium "wax alkyl" phenate, and di(2-ethylhexyl) phenyl phosphite are heated until visual homogeneity is obtained.

6. A stabilizer composition according to claim 1 wherein the alkyl group of the monoalkyl compound linked to tin through carbon is n-butyl.

7. A stabilizer composition according to claim 1 wherein the monoalkyl compound is a monoalkyltin tris mercaptocarboxylic acid ester.

8. A stabilizer composition according to claim 1 wherein the monoalkyltin compound is a monoalkyltin mercaptocarboxylic acid ester sulfide.

9. A stabilizer composition in accordance with claim 1 in which the alkyl group of the dialkyltin compound linked to tin through carbon is n-butyl.

10. A stabilizer composition according to claim 1 wherein the dialkyltin compound is a dialkyltin mercaptocarboxylic acid ester.

11. A stabilizer composition according to claim 1 wherein the dialkyltin compound is a dialkyltin sulfide.

12. A stabilizer composition according to claim 1 wherein the dialkyltin compound is a dialkyltin mercaptocarboxylic acid ester sulfide.

13. A stabilizer composition in accordance with claim 1 wherein the mono and dialkyltin mercaptocarboxylic acid esters and ester sulfides are selected from the class consisting of thioglycolate esters and 3-mercaptopropionate esters.

14. A stabilizer composition according to claim 13 wherein the monoalkyltin mercaptocarboxylic acid ester sulfide is n-butyltin isooctyl thioglycolate sulfide.

15. A stabilizer composition according to claim 13 wherein the dialkyltin mercaptocarboxylic acid ester is di-n-butyltin di(isooctyl thioglycolate).

16. A stabilizer composition in accordance with claim 1 wherein the organic salt is selected from the class consisting of barium and calcium salt of a sulfonic acid having at least 10 carbon atoms, and the barium salt of a substituted phenol having at least 10 carbon atoms.

17. A stabilizer composition in accordance with claim 1 wherein the organic salt or salts are present in the stabilizer in such a ratio that the number of barium equivalents to the number of barium equivalents to the number of equivalents of the organic acid residue of the organic salt is greater than two.

18. A stabilizer composition in accordance with claim 16 wherein the barium salt is a salt of nonylphenol.

19. A stabilizer composition in accordance with claim 16 wherein the organic salt is a mixed salt from a phenol and a sulfonic acid.

20. A stabilizer composition according to claim 1 including at least one auxiliary stabilizer selected from the group of hindered phenols, organic phosphites, organic sulfides, zinc and stannous salts of carboxylic acids having from 7 to 24 carbon atoms, and di-n-butyltin oxide complexes with organic esters.

21. A polyvinyl chloride (PVC) resin composition having an enhanced resistance to early discoloration when heated to 400° F. comprising a polyvinyl chloride resin and a stabilizer composition in accordance with claim 1 in a weight ratio of from 0.1 to 5 parts of stabilizer composition to 100 parts of resin.

22. A polyvinyl chloride resin composition comprising a polyvinyl chloride resin and a stabilizer composition in accordance with claim 7.

23. A polyvinyl chloride composition comprising a polyvinyl chloride resin and a stabilizer composition in accordance with claim 10.

24. A polyvinyl chloride resin composition comprising a polyvinyl chloride resin and a stabilizer composition according to claim 8.

25. A polyvinyl chloride resin composition comprising a polyvinyl chloride resin and a stabilizer composition according to claim 11.

26. A polyvinyl chloride resin composition comprising a polyvinyl chloride resin and a stabilizer composition in accordance with claim 16.

27. A polyvinyl chloride resin composition comprising a polyvinyl chloride resin and a stabilizer composition in accordance with claim 20.

28. A polyvinyl chloride resin composition comprising a polyvinyl chloride resin, a stabilizer composition according to claim 1, and a lubricant selected from the class of calcium stearate, paraffin wax, petrolatum, and ester waxes.

29. A polyvinyl chloride resin composition comprising a polyvinyl chloride resin, a stabilizer composition in accordane with claim 1, and a polymeric modifier for improving the toughness or impact resistance of unplasticized resins.

References Cited
UNITED STATES PATENTS

| | | | |
|---|---|---|---|
| 2,013,941 | 9/1935 | Young et al. | 260—45.7 |
| 2,648,650 | 8/1953 | Weinberg et al. | 260—45.75 |
| 3,067,151 | 12/1962 | Terry et al. | 260—45.7 |
| 3,533,975 | 10/1970 | Scullin | 260—23 |
| 3,565,930 | 2/1971 | Kauder et al. | 260—45.75 |
| 3,446,765 | 5/1969 | Pryer | 260—23 |

DONALD E. CZAJA, Primary Examiner

V. P. HOKE, Assistant Examiner

U.S. Cl. X.R.

260—45.7 S, 45.7 R, 23 XA; 252—406